H. BOMAN.
FISHHOOK.
APPLICATION FILED DEC. 30, 1918.
1,312,824.
Patented Aug. 12, 1919.
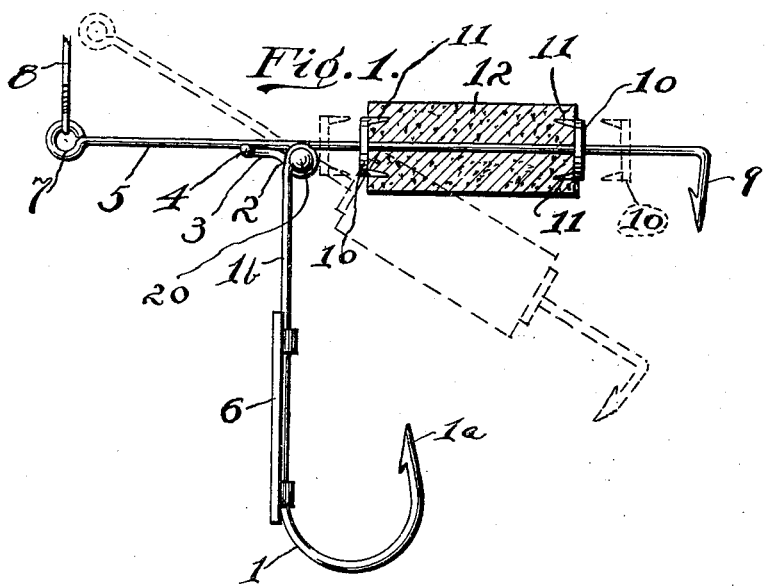
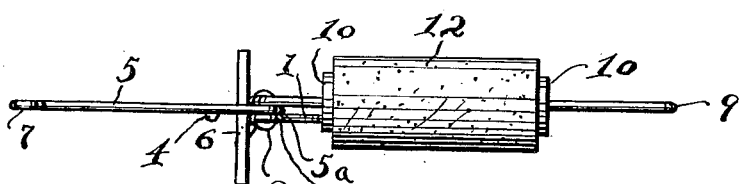
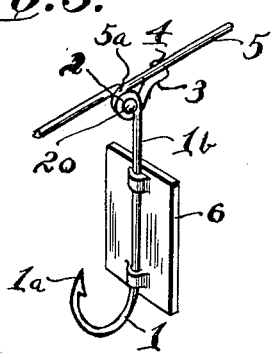
Inventor
H. Boman
By H.S. Hill
Attorney

UNITED STATES PATENT OFFICE.

HENRY BOMAN, OF TULSA, OKLAHOMA.

FISHHOOK.

1,312,824.  Specification of Letters Patent.  Patented Aug. 12, 1919.

Application filed December 30, 1918. Serial No. 268,921.

*To all whom it may concern:*

Be it known that I, HENRY BOMAN, a citizen of the United States, residing at Tulsa, in the county of Tulsa, State of Oklahoma, have invented a new and useful Fishhook; and I do hereby declare the following to be a full, clear, and exact description of the invention, such as will enable others skilled in the art to which it appertains to make and use the same.

The present invention relates to a fish hook, and has for its object to provide a device of this character which embodies novel features of construction whereby a pronged arm is automatically swung into engagement with the fish when there is a pull upon the line, thereby rendering it impossible for the fish to become disengaged from the main hook.

Further objects of the invention are to provide a fish hook of this character which is comparatively simple and inexpensive in its construction, which can be used in substantially the same manner as an ordinary fish hook, which is positive in its action, and which admits of the float being readily removed and replaced by a new float or by a float of a different size.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a fish hook constructed in accordance with the invention, the float being shown in section, and the pronged arm being shown by full lines in inoperative position and by dotted lines as partially swung downwardly toward the main hook.

Fig. 2 is a top plan view of the device with the pronged arm swung upwardly into inoperative position.

Fig. 3 is a detail view of the main hook on a reduced scale, showing the resistance plate which is fitted thereon to retard swinging movement of the hook through the water.

Corresponding and like parts are referred to in the following description and indicated in all the views of the drawings by the same reference characters.

Referring to the drawings, which illustrate one embodiment of the invention, the numeral 1 designates the main hook which has one end thereof returned and pointed at 1ª, while the other end thereof forms a shank 1ᵇ and terminates in a pivot eye 2. This hook may be conveniently formed from a single length of wire, and after forming the eye 2 the wire is extended rearwardly at right angles to the shank of the hook, as indicated at 3, terminating in a laterally extending stop arm 4 which is suitably bent to provide a seat for the lever 5. A plate 6 is shown as applied to the shank of the hook 1 and arranged in a plane at right angles to the hook, said plate serving to offer resistance to the forward swinging of the hook when the line is pulled and the pronged end of the lever swung downwardly toward the hook, as will be hereinafter described.

The lever 5 is provided at an intermediate point in the length thereof with an eye 5ª which is pivotally connected by a pin 20 to the eye 2 of the main hook. The rear end of the lever 5 terminates in an eye 7 to which the fish line 8 is attached, while the other end of the lever terminates in a downwardly extending barbed prong 9. The arm of the lever 5 which is provided with the prong 9 has a pair of disks 10 slidably mounted thereon, said disks being provided upon their opposed faces with sharp teeth 11 which are adapted to penetrate a float 12 of cork or similar material which is fitted upon the lever and interposed between the disks. The disks 10 are slidable back and forth upon the lever so that they can be readily brought into and out of engagement with the cork, and the cork is slit so that it can be applied to the lever from one side thereof. It will thus be obvious that the cork can be readily removed and replaced, and that larger or smaller pieces of cork can be applied to the lever as may be found desirable.

In the operation of the device the main hook 1 is baited in the usual manner and the line 8 attached to the eye 7 of the lever 5. When the hook is submerged the float 12 will swing the pronged arm of the lever upwardly away from the sharp end of the hook, and the fish can take the bait upon the main hook in the usual manner. However, a sharp pull upon the line 8 will swing the pronged end 9 of the lever downwardly toward the pointed end of the main hook, thereby causing the prong to engage the fish and prevent the fish from becoming disengaged from the main hook.

Having thus described the invention, what I claim as new and desire to secure by Letters Patent, is:—

1. A device of the character described including a main hook having a shank and a pointed end, a lever pivoted between its ends on the shank of the main hook, said lever being provided at one end with cord attaching means and at its other end with a lateral prong adapted to be swung toward the pointed end of the hook when there is a pull on the cord, a float on the pronged arm of the lever, and a resistance plate applied to the shank of the hook and arranged in a plane at right angles to that of the hook.

2. A device of the character described including a main hook having a shank and a pointed end, a lever pivoted between its ends on the shank of the main hook, said lever being provided at one end with cord attaching means and at its other end with a lateral prong adapted to be swung toward the pointed end of the hook when there is a pull on the cord, a stop arm projecting from the shank of the hook to engage the lever and limit the swinging movement thereof, and a float upon the pronged arm of the lever.

3. A device of the character described including a main hook having a shank and a pointed end, a lever pivoted between its ends on the shank of the main hook, said lever being provided at one end with cord attaching means and at its other end with a lateral prong adapted to be swung toward the pointed end of the hook when there is a pull on the cord, a pair of opposed disks slidable on the pronged arm of the lever and provided upon their opposed faces with teeth, and a float removably clamped between the disks and engaged by the teeth thereof.

In testimony whereof I have signed my name to this specification in the presence of two subscribing witnesses.

HENRY BOMAN.

Witnesses:
CHARLIE BOMAN,
EMMA BOMAN.

Copies of this patent may be obtained for five cents each, by addressing the "Commissioner of Patents, Washington, D. C."